(12) United States Patent
Watanabe et al.

(10) Patent No.: US 6,701,088 B1
(45) Date of Patent: Mar. 2, 2004

(54) IP PACKET TRANSMISSION EQUIPMENT

(75) Inventors: Atsushi Watanabe, Tokyo (JP); Satoru Okamoto, Tokyo (JP)

(73) Assignee: Nippon Telegraph and Telephone Corporation (JP)

( * ) Notice: Subject to any disclaimer, the term of this patent is extended or adjusted under 35 U.S.C. 154(b) by 538 days.

(21) Appl. No.: 09/636,822

(22) Filed: Aug. 14, 2000

(30) Foreign Application Priority Data

Aug. 12, 1999 (JP) .......................................... 11-228397

(51) Int. Cl.[7] .............................................. H04J 14/00
(52) U.S. Cl. ........................ 398/51; 398/79; 370/355; 370/356
(58) Field of Search ................. 359/123–124, 359/128, 110; 370/355–356

(56) References Cited

U.S. PATENT DOCUMENTS

| | | | | |
|---|---|---|---|---|
| 6,233,075 B1 | * | 5/2001 | Chang et al. | 359/124 |
| 6,317,236 B1 | * | 11/2001 | Saunders | 359/158 |
| 6,525,851 B2 | * | 2/2003 | Chang et al. | 359/124 |

FOREIGN PATENT DOCUMENTS

| | | |
|---|---|---|
| EP | 0 986 226 A2 * | 3/2000 |
| EP | 1073306 A2 | 1/2001 |
| EP | 1073307 A2 | 1/2001 |
| WO | WO-98/47039 | 10/1998 |

OTHER PUBLICATIONS

Okamoto, "Photonic Transport Network Architecture and OA&M Technologies to Create Large–Scale Robust Networks", IEEE Journal On Selected Areas In Communications, XP000785931, vol. 16, No. 7, Sep. 1, 1998, pp. 995–1007.

Sato et al., "Photonic Transport Technologies to Create Robust Backbone Networks", IEEE Communications Magazine, XP000835322, vol. 37, No. 8, Aug. 1999, pp. 78–87.

European Search Report, EP00117455, Aug. 2, 2002, pp. 1–3.

* cited by examiner

Primary Examiner—Kinfe-Michael Negash
(74) Attorney, Agent, or Firm—Connolly Bove Lodge & Hutz LLP (57) ABSTRACT

An arbitrary signal is converted to IP packets, which are routed by an IP packet routing part to Optical path signal conversion parts. Optical path signals from the Optical path signal conversion parts are provided directly to an optical path route switching part of an IP packet transmission equipment. By the optical path route switching part, optical path signals, obtained by wavelength-demultiplexing of OTM signals from optical backbone transmission lines by OTM/optical path signal conversion parts, and optical path signals from the Optical path signal conversion parts are cross-connected to output routes according to their destinations.

8 Claims, 9 Drawing Sheets

IP/OPTICAL PATH SIG CONVERSION PART

FIG. 5B

OPTICAL PATH SIG/IP CONVERSION PART

OPTICAL PATH SIG/OTM CONVERSION PART

FIG. 7B

OTM/OPTICAL PATH SIG CONVERSION PART

IP PACKET TRANSMISSION EQUIPMENT

BACKGROUND OF THE INVENTION

The present invention relates to a packet transmission equipment for a packet transmission system which implements communications through exchanges of packets as communication units. More particularly, the invention pertains to an IP packet transmission equipment for use in an IP communication network which carries out communications through exchanges of IP (Internet Protocol) packets as communication units.

With the recent explosive popularization of the Internet or the like, the data traffic volume in global area networks is now dramatically on the increase. In other words, the global area networks are evolving from the conventional voice traffic to a data traffic oriented network architecture. Various organizations predict that the IP backbone traffic will become increasingly denser. Against such a backdrop every IP router maker is pursuing the development of routers on the order of tera bits. A WDM (Wavelength Division Multiplexing) transmission system is considered as a near-term solution for the problem of supporting such high-capacity IP traffic, and each maker is also making strenuous efforts in the development of a WDM transmission equipment.

Conventionally, IP packets are transmitted over an ISDN system, but high-capacity transmission over a leased circuit utilizes an IP packet transmission equipment based on a technique called an IP over SDH (Synchronous Digital Hierarchy) which stores IP packets in an SDH path payload area. For particulars of this technique, see IETF Regulation RFC1619.

Figure 1:
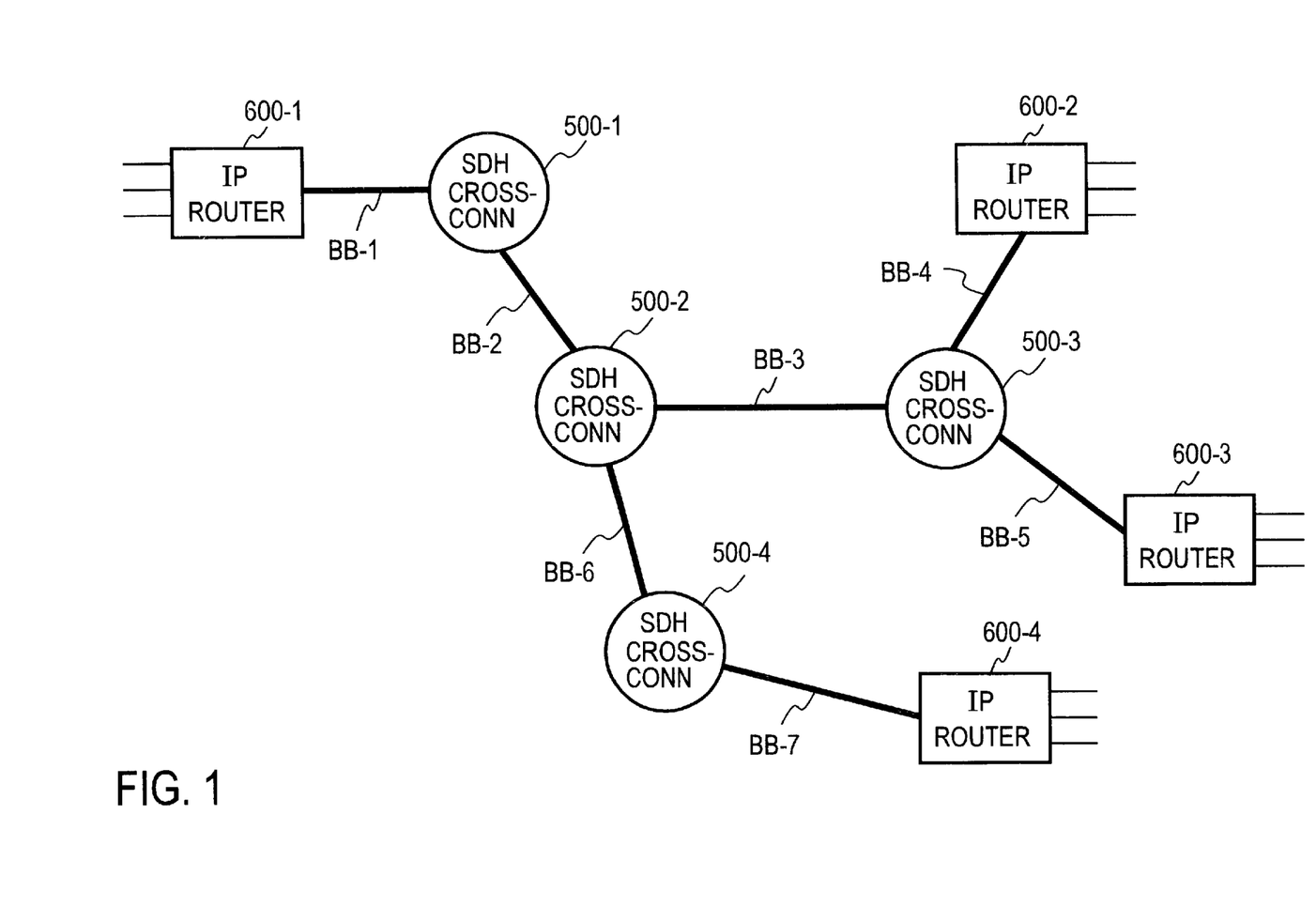
FIG. 1 is a diagram depicting a part of a conventional backbone communication network using an SDH signal.

With the above-mentioned IP over SDH, as shown in FIG. 1, IP packets are accommodated in the SDH path payload for each destination, and IP routers at remote locations are interconnected over a SDH transmission network. For example, between an IP router 600-1 and IP routers 600-2 tp 600-4 there are set SDH paths. The SDH paths are multiplexed to construct an STM (Synchronous Transport Module) signal. The IP routers 600-1 to 600-4 are each connected to a local transmission liner of lower speed and lower capacity than a backbone transmission line BB, or to server equipment. The STM signal is transmitted over backbone transmission lines BB-1 to BB-7, and at SDH cross-connects 500-1 to 5004 on its way to destination, routing takes place for each SDH path signal so that the STM signal is sent to its desired destination.

As an IP packet transmission system suitable for use in an IP communication network which transfers information in units of IP packets, there is proposed an optical transmission system which performs routing at the optical level to build a higher-capacity IP communication network unlike the conventional SDH transmission system of FIG. 1 which involves routing at the electrical level in SDH cross-connects. In the optical transmission system, information is conveyed over the optical path transport network with IP packets accommodated in an optical path payload portion. In an optical path cross-connect which is a transit node in the optical path transport network, wavelength routing is performed which sets routes to respective destinations of transmission signals on a wavelength-wise basis. Such an optical communication network is disclosed in, for example, K. Sato, S. Okamoto and H. Hadama, "Optical Path layer Technologies to Enhance B-ISDN Performance," ICC'93, May 23, 1993.

Figure 2:
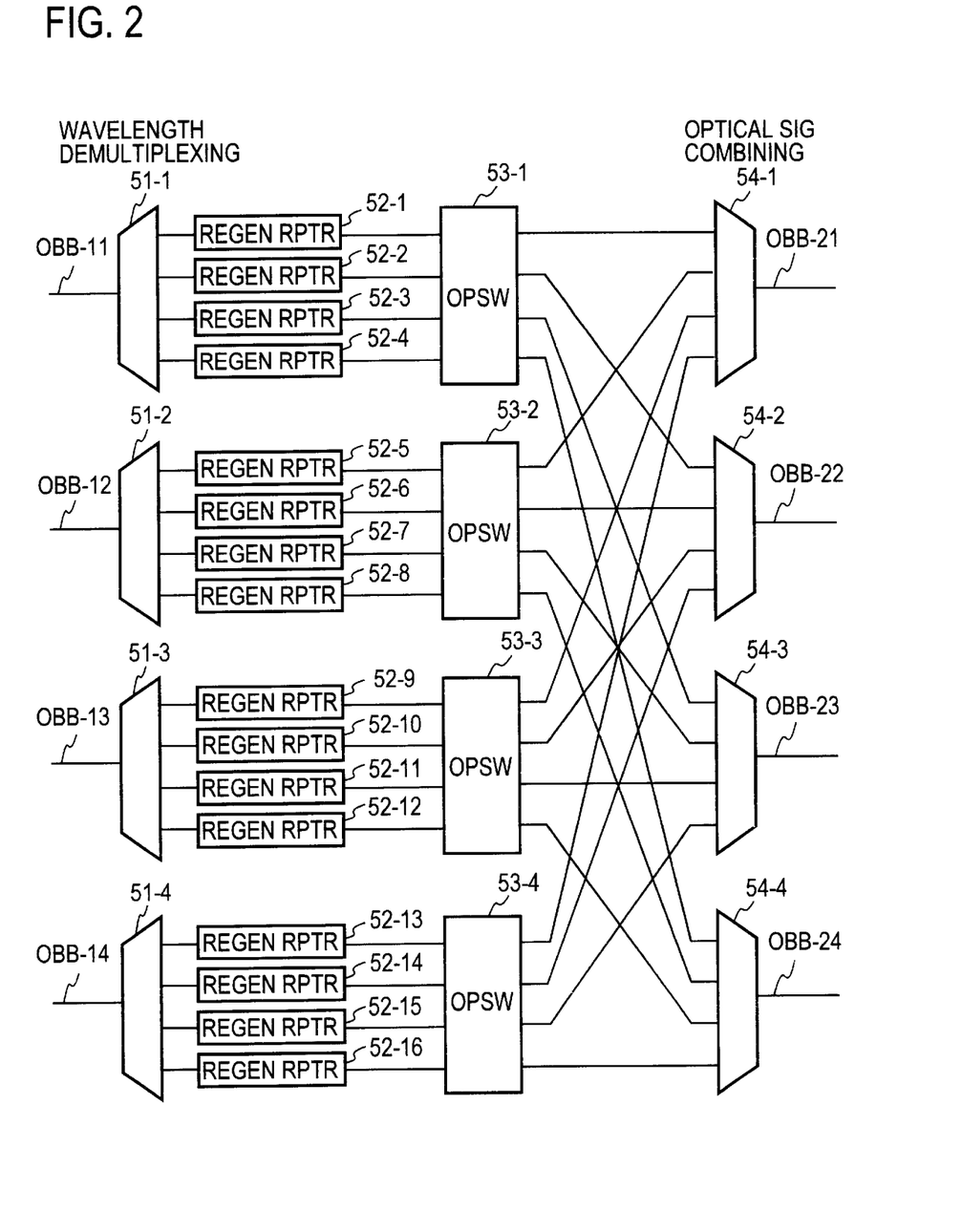
FIG. 2 is a block diagram depicting an example of an optical cross-connect apparatus which constitutes one transit node for optical signals in a communication network.

FIG. 2 depicts a WDM (Wavelength Division Multiplexing) type optical communication channel disclosed in, for instance, Japanese Patent Application Laid-Open Gazette No. 7-67153. It is considered that the illustrated structure can be used for each cross-connect 500 in FIG. 1 to handle an optical signal. In the WDM communication channel, wavelength-multiplexed signals WDMS provided to input optical backbone transmission lines OBB-11 to OBB-14 are demultiplexed for each wavelength in wavelength demultiplexing parts 51-1 to 51-3, then the optical signals of the individual wavelengths are regenerated by optical regenerators 52-1 to 52-16, respectively, then the regenerated optical signals are cross-connected by optical switches 53-1 to 53-4 to predetermined routes and are multiplexed in wavelength multiplexing parts 54-1 to 54-4, from which the wavelength-multiplexed optical signals are provided to output optical backbone transmission lines OBB-21 to OBB-24. The optical regenerators 52-1 to 52-16 each convert the optical path signal of one wavelength to an electrical signal, and applies it to a laser light source, thereby generating an amplified and shaped optical path signal.

Either literature mentioned above does not disclose how each of the IP routers 600-1 to 600-4 in the transmission system of FIG. 1 are constructed to convert signals of arbitrary formats to IP packets and how they are connected to the cross-connect 600-1. The most common-sense way is to connect, for instance, the output of the IP router 600-1 to one of the input optical highways in FIG. 2 and apply the wavelength-multiplexed signal from the IP router 600-1. To this end, it is necessary for the IP router 600-1 to convert respective input signals to IP packets, convert them to optical path signals by wavelength-multiplexing and provide the optical path signals to any one of the wavelength demultiplexing parts 51-1 to 51-4 of the cross-connect apparatus shown in FIG. 2. Such IP routers use laser light sources for the conversion of IP packets to optical path signals. The wavelengths of these laser light sources need to be always monitored and controlled together with the wavelengths of laser light sources used in the optical regenerators 52-1 to 52-16.

As described above, in the case of building the IP communication network by an optical path transmission network and connecting the IP routers to the optical cross-connects, laser light sources are provided in the IP routers. The optical signals generated by the laser light source in each IP router is regenerated by the laser light source of the optical regenerator in each optical cross-connect. Furthermore, it is necessary to monitor whether each laser light source operates at a predetermined wavelength, or effect control for wavelength stabilization. As the scale of the system becomes larger, the scale of monitoring also becomes larger accordingly.

SUMMARY OF THE INVENTION

It is therefore an object of the present invention to provide an IP packet transmission equipment which permits transmission and reception of IP packets and is small in the number of parts used and hence lightens the workload for control.

According to the present invention, there is provided an IP packet transmission equipment which is provided in a node of a transmission network containing backbone transmission lines and local transmission liners and transmits optical path signals between source and destination nodes via logically defined optical paths, said apparatus comprising:

wavelength demultiplexing means which receives from each of the backbone transmission lines a wavelength-multiplexed signal produced by wavelength-multiplexing optical path signals containing IP packets and demultiplexes the wavelength-multiplexed signal to optical path signals of individual wavelengths;

IP packet routing means for converting a transmission signal input from each of the local transmission liners to IP packets and for outputting the IP packets to routes corresponding to their destinations;

IP/optical path converting means provided in an output route of the IP packet routing means, for converting the IP packets to optical path signals;

optical path switching means which receives the optical path signals from the wavelength demultiplexing means and the optical path signals from the IP/optical path converting means and cross-connects the optical path signals to output routes corresponding to their destinations; and optical path signal multiplexing means which wavelength multiplexes the optical path signals on predetermined output routes from the optical path switching means to generates an output wavelength-multiplexed signal and outputs the wavelength-multiplexed signal to each backbone transmission line.

With the above arrangement, the optical regenerators corresponding to OTM/optical path signal conversion parts connected directly to the IP packet transmission equipment in the prior art example becomes unnecessary, and hence it is possible to construct an IP packet transmission equipment with a smaller number of laser light sources than in the prior art.

DETAILED DESCRIPTION OF THE PREFERRED EMBODIMENT

First Embodiment

Figure 3:
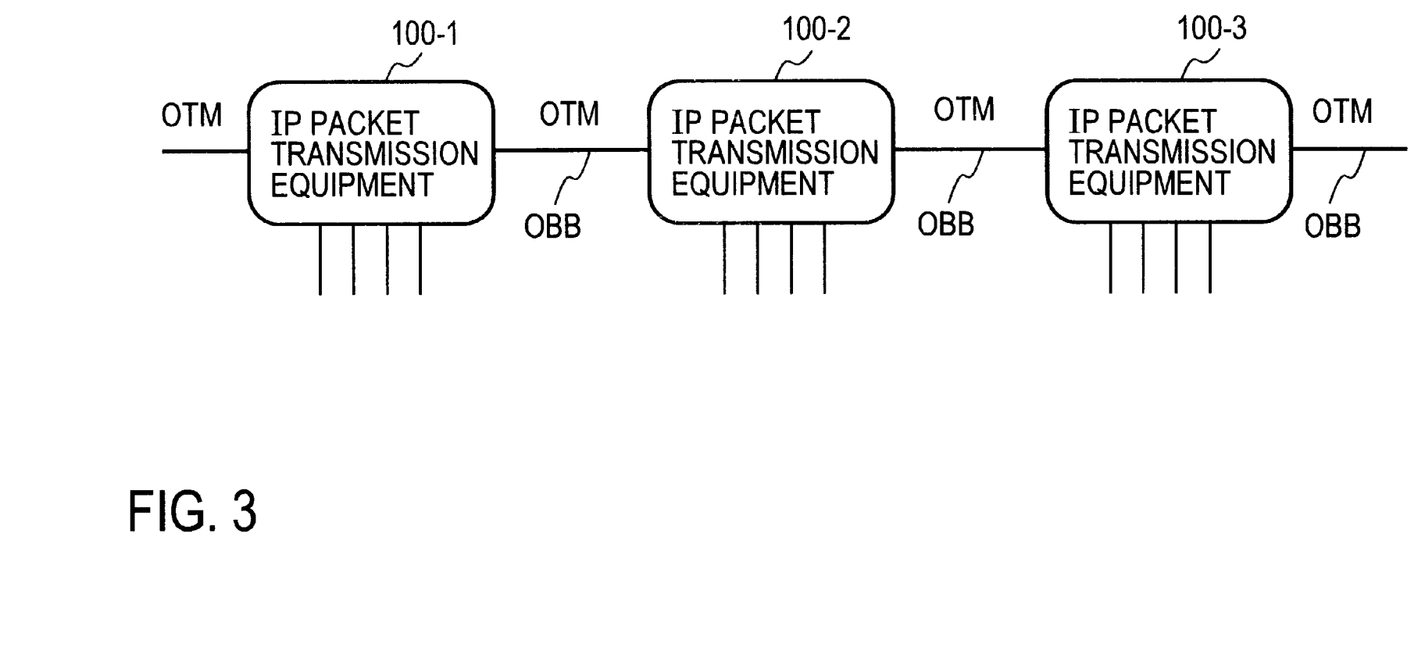
FIG. 3 is a diagram showing part of a communication network in which IP packet transmission equipments according to the present invention are used as nodes.

FIG. 3 illustrates part of an IP packet transmission network in which IP packet transmission equipments 100-1, 100-2, 100-3, . . . according to the present invention are connected by optical backbone transmission lines OBB. As will be understood from the description given later on, a signal of an arbitrary format can be input directly to the IP packet transmission equipment of the present invention through the use of an appropriate interface.

Figure 4:
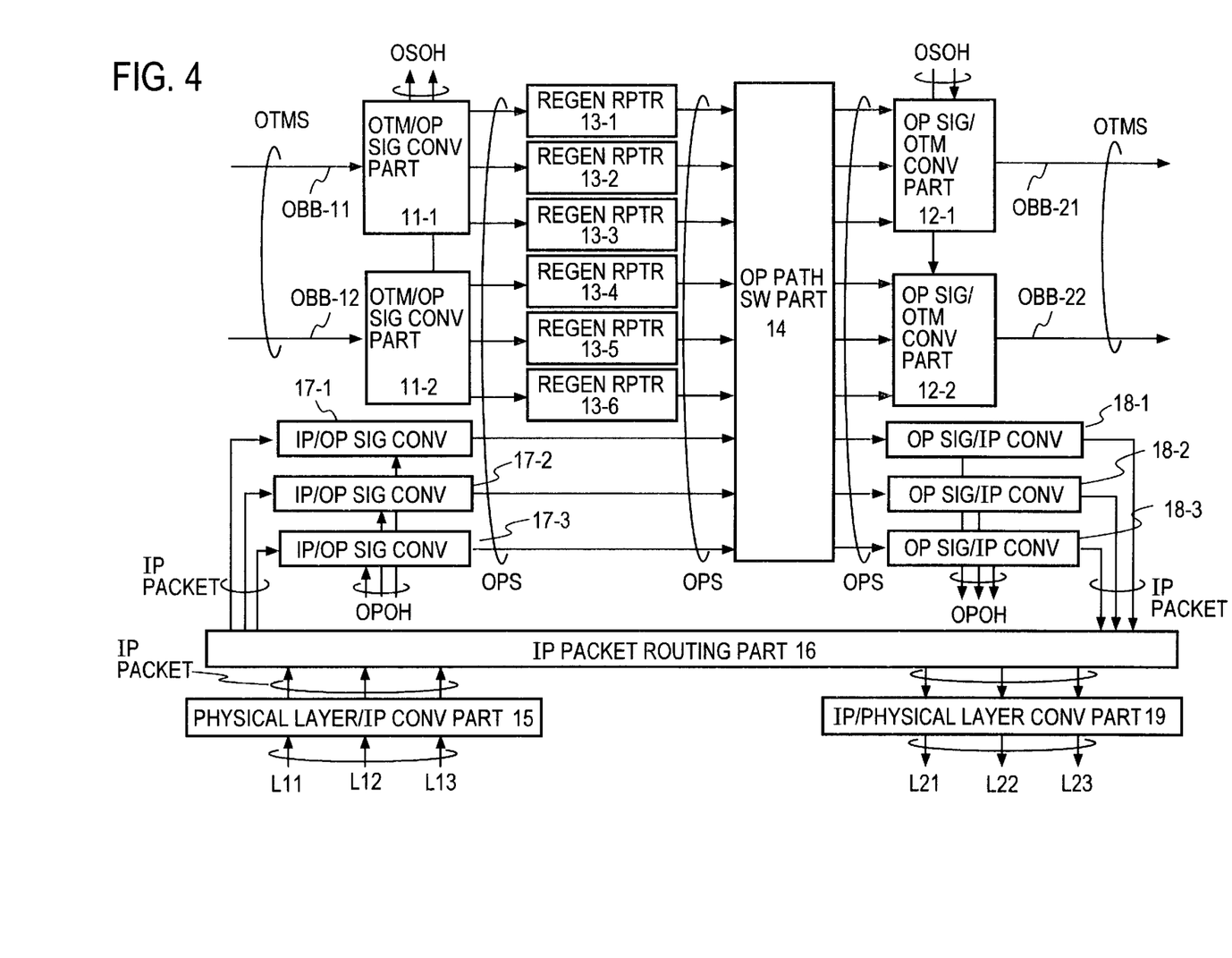
FIG. 4 is a block diagram illustrating a first embodiment of the IP packet transmission equipment according to the present invention.

FIG. 4 illustrates in block form a first embodiment of the IP packet transmission equipment according to the present invention.

Figure 6:
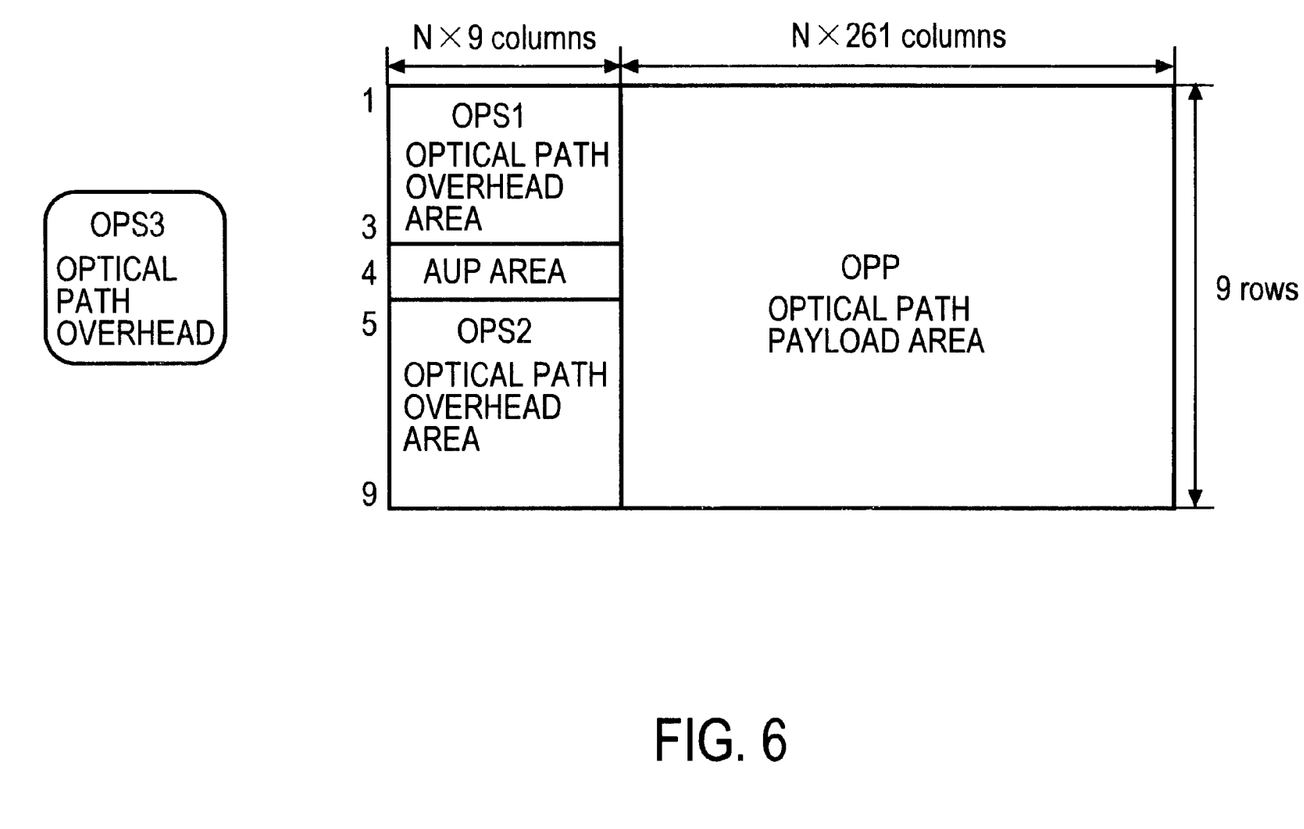
FIG. 6 is a diagram showing the format of an optical path signal.

In OTP/optical path conversion parts 11-1 and 11-2, OTM (Optical Transport Module) signals (which will be described later on with reference to FIG. 8) input thereto from input optical backbone transmission lines OBB-11 and OBB-12, defined as Network-Node-Interface (NNI) of an optical transparent network, are converted to optical path signals (which will be described later on with reference to FIG. 6). Optical regenerators 13-1 to 13-6 convert the optical path signals OPS from the OTM/optical path signal conversion parts 11-1 and 11-2 to electrical signals, which are provided to laser light sources (not shown) of the same wavelengths as those of the input optical path signals OPS, by which they are amplified and shaped to restore the original optical path signals OPS. A physical layer/IP conversion part 15 is a means by which signals of arbitrary formats (SDH signals, ATM signals, ethernet signals, or the like) from branch transmission lines L11, L12 and L13, each formed by an arbitrary physical medium (a metal coaxial cable, optical finer, or the like), are converted to IP packets. In many cases, the branch transmission lines L11, L12 and L13 are lower in speed and in capacity than the optical backbone transmission line, but they need not be limited specifically to such transmission lines and may be transmission lines equivalent to the backbone transmission line.

An IP packet routing part 16 distributes the IP packets to routes according to their destinations. Optical path signal conversion parts 17-1, 17-2 and 17-3 convert the IP packets (electrical signals) to optical path signals OPS. An optical path switching part 14 cross-connect the regenerated optical path signals OPS from the optical regrnetators 13-1 to 13-6 and the optical path signals OPS from the Optical path signal conversion parts 17-1, 17-2 and 17-3 to optical path signal/ OTM conversion parts 12-1 and 12-2 and optical path signal/IP conversion parts 18-1, 18-2 and 18-3 according to destinations of the input signals. The optical path signals OPS provided to the optical path signal/OTM conversion parts 12-1 and 12-2 are multiplexed in wavelength and provided as OTM signals to output optical backbone transmission lines OBB-21 and OBB-22. The optical path signals OPS fed to the optical path signal/IP conversion parts 18-1, 18-2 and 18-3 are restored to IP packets (electrical signals), which are provided to the IP packet routing part 16.

The IP packet routing part 16 distributes the IP packets to output route according to their destinations and applies them to an IP/physical layer conversion part 19. The IP/physical layer conversion part 19 converts the IP packets to signals of desired forms (such as SDH and ATM signals) and provides them to branch transmission lines L21, L22 and L23.

As described above, the IP packet transmission equipment according to the present invention has a functional configuration in which optical cross-connects and IP routers are integrated and the outputs from the Optical path signal conversion parts 17-1, 17-2 and 17-3 are provided directly to the optical path switching part 14 for the reasons given just below. The optical path signals transmitted over a long distance via the optical backbone transmission lines have been attenuated and waveform-distorted, and hence they cannot be sent intact to the IP packet transmission equipment which constitutes the next node; therefore, the optical path signals are in need of amplification and shaping by the optical regenerators 13-1 to 13-6. On the other hand, the optical path signals OPS from the Optical path signal conversion parts 17-1, 17-2 and 17-3 are generated by converting the IP packets to optical path signals and are free from the waveform distortion by transmission, and hence they need not be regenerated. Accordingly, the required number of laser light sources used is smaller than in the case of connecting IP routers to the conventional transit transmission apparatus as depicted in FIG. 2. Besides, since it is unnecessary to employ an OTM/optical path signal conversion part and an optical path signal/OTM conversion part needed to adjust the input signal format in the case of connecting the conventional IP router and the optical cross-connect device, the scale of the IP packet transmission equipment can be reduced as a whole.

Turning back to FIG. 3, the operation of the first embodiment will be described below in connection with the IP packet transmission from the IP packet transmission equipment 100-1 to 100-3 via 100-2. This is a model in which an optical path is logically defined between the IP packet transmission equipmentes 100-1 and 100-3. The IP packet transmission equipmentes 100-1 to 100-3 each have the configuration depicted in FIG. 4.

A description will be given first of the IP packet transmission equipment 100-1 which is the sending side in this case.

Arbitrary signals (such as STM, ATM, or ethernet signals) input from the input branch transmission lines L11 to L13 are converted by the physical layer/IP conversion part 15 to IP packets, which are distributed by the IP packet routing part 14 on a packet-wise basis. In FIG. 4 the IP packet input to the Optical path signal conversion part 17-1 is predetermined or predestined to be cross-connected by the optical path switching part 14 to the optical path signal/OTM conversion part 12-1 and thence carried to the IP packet transmission equipment 100-3.

Figure 5A:
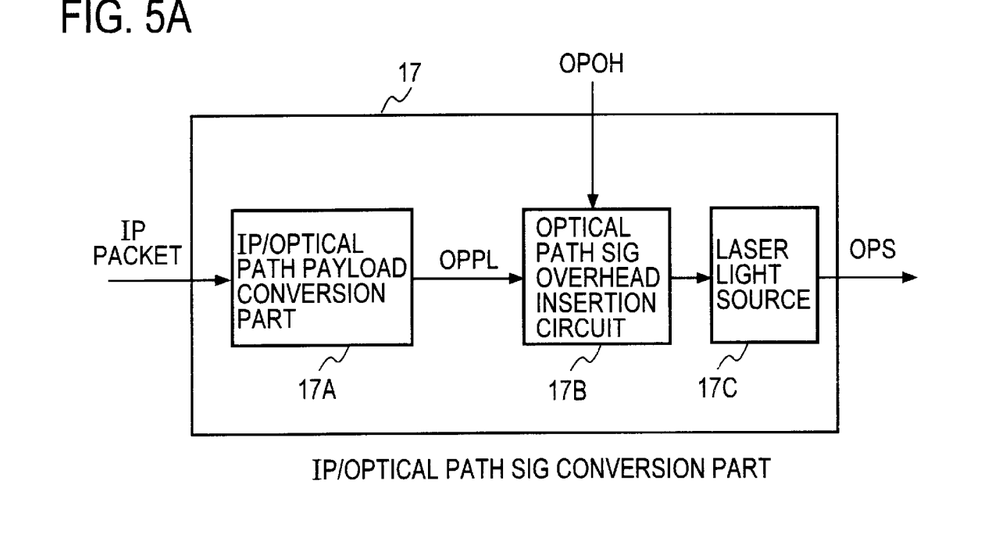
FIG. 5A is a block diagram of an Optical path signal conversion part.

The Optical path signal conversion part 17-1 comprises, as depicted in FIG. 5A, an IP/optical path payload conversion part 17A, an optical path signal overhead insertion circuit 17B and a laser light source 17C. The IP/optical path payload conversion part 17A writes the input IP packets into an optical path payload area OPP in an optical path signal shown in FIG. 6. The optical path signal OPS is composed of a data string of 9×(270×N) bytes and an optical path overhead OPOH (OPS3) which is superimposed on the data string. The data string is divided into an optical path overhead area OPS1 (3×(9×N) bytes), an optical path overhead area OPS2 (5×(9×N) bytes), administrative unit pointer area AU (1×(9×N) bytes) and an optical path payload area OPP (9×(261×N) bytes).

The overhead information includes, for example, an optical path trace identifier, connection control information about a signal label, administrative information about an optical path user channel and optical path states, and monitoring information such as a bit error rate monitoring byte and a state-of-synchronization monitoring byte. Such overhead information needed for each particular system is stored in predetermined overhead areas OPS1, OPS2 and OPS3.

Such an optical signal format is disclosed in, for example, Satoru Okamoto, "Photonic Transport Network Architecture and OA & M Technologies to Create Large-Scale Robust Networks," IEEE Journal on Selected Areas in Communications, vol. 16, September, 1998, pp.995–1007 and Satoru Okamoto, "NNI Structure for WDM Optical Path Transport Network," Proc. of the 1997 IEICE Conference, Sept., 1997, B-10-98.

Turning back to FIG. 4, a description will be given of the IP packet transmission equipment which is a transit node in FIG. 3.

The optical path overhead area OPS3 is superimposed on an optical path payload signal through utilization of a technique of modulating a pilot tone or using optical CDMA, but in some cases the optical path overhead area OPS3 is not used.

In the IP/optical path payload conversion part 17A, each IP packet is mapped into the optical path payload area OPP by copying its data string at a changed transmission rate, or by copying the data string after rendering the IP packet into an error correcting code.

In this case, however, each IP packet is a variable-length data string, and the respective IP packets arrive at irregular time intervals. On the other hand, since the optical path payload is a continuous data string, it is necessary to fill the blank between such discontinuously arriving individual IP packets with dummy data and delimit continuously arriving IP packets. To this end, a PPP (Point-to-Point Protocol) scheme is usually employed. Since the point-to-point protocol is described in detail in IETF Regulation RFC1661 "The Point-to-Point Protocol (PPP)", only its general outlines will be described below.

With the PPP scheme, data strings called a PPP header (4 bytes) and a PPP trailer (2 bytes) are added to the IP packet to form a data string called a PPP frame. The PPP trailer is used to detect an error in PPP frame data. The IP packet is mapped into the optical path payload area OPP through the PPP frame. The IP packet can be taken out of the PPP frame by removing the PPP header and the PPP trailer. Incidentally, adjacent PPP frames are always separated by a data string of more than one byte which is "7E" in hexadecimal (i.e., "01111110"). The above-mentioned dummy data is a data string of a required number of bytes which is "7E" in hexadecimal. When PPP is used, the IP packet is mapped into OPP through PPP. And the IP packet can be taken out by taking out PPP from OPP and then removing the PPP header and the PPP trailer.

Turning back to FIG. 5A, the optical path payload signal generated by the IP/optical path payload conversion part 17A is sent to the optical path signal overhead insertion circuit 17B. In the optical path signal overhead insertion circuit 17B, optical path overhead data OPOH is added to the optical path overhead areas OPS1 and 2, and an administrative unit pointer AUP indicating the phase difference between the optical path signal format and the optical path payload is added to the optical path payload signal; thereafter, the optical path payload signal is provided to the laser light source 17C, wherein it is converted from electrical to optical form. The output wavelength of the laser light source may be either fixed or variable. In the case of a variable-wavelength output laser, it is assigned a wavelength predetermined so that the same wavelengths are not used on the output optical transmission line. Thereafter, the laser output is added to the optical path overhead area OPS3 to obtain the optical path signal OPS. The thus obtained optical path signals OPS is provided by the optical path switching part 14 to an output port predetermined for output to a desired output optical transmission line OTL-21, and is input to the optical path signal/OTM conversion part 12-1.

Figure 7A:
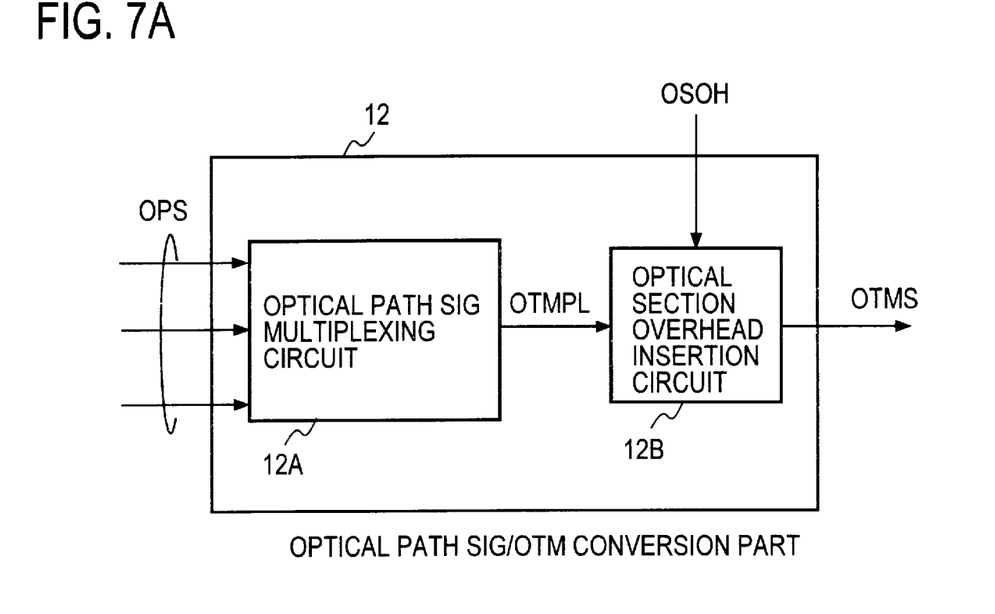
FIG. 7A is a block diagram of an optical path signal/OTM conversion part.

The optical path signal/OTM conversion parts 12-1 and 12-2 each comprise an optical path signal multiplexing circuit 12A and an optical section overhead insertion circuit 12B as depicted in FIG. 7A. The input optical path signals OPS of different wavelengths, shown in FIG. 6, are multiplexed in wavelength (frequency) in the optical path signal multiplexing circuit 12A to form an OTM payload signal, which is applied to the optical section overhead insertion circuit 12B. In the optical section overhead insertion circuit 12B optical section overhead data OSOH is added to the OTM payload signal to generate an OTM signal, which is provided to an output optical transmission line OTL-1.

Figure 8:
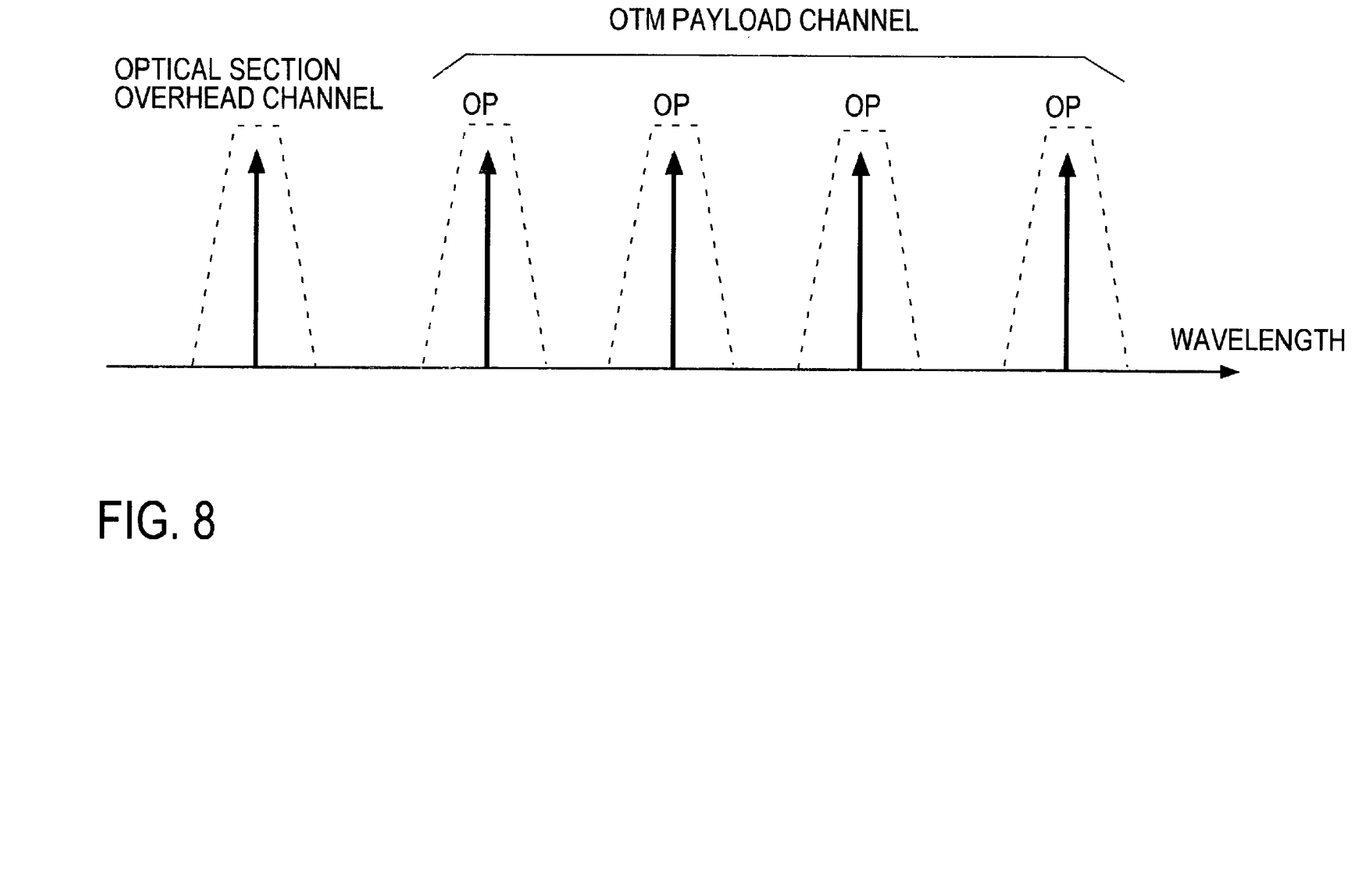
FIG. 8 is a diagram depicting the format of an OTM signal.

The OTM signal thus generated is composed of an optical section overhead channel and an OTM payload channel as depicted in FIG. 8. In the OTM payload channel there is one more optical paths shown in FIG. 6.

The OTM signal sent from the afore-mentioned IP packet transmission equipment 100-1 is provided via the input optical backbone transmission line OBB-11 to the OTM/optical path signal conversion part 11-1, wherein it is separated into optical path signals OPS of respective wavelengths. The optical path signals OPS are regenerated by the optical regenerator 13-1, thereafter being cross-connected by the optical path switching part 14 to their predetermined routes. The optical path signals OPS input to the optical path signal/OTM conversion part 12-1 are wavelength-multiplexed to form an OTM signal, which is provided to the output optical backbone transmission line OBB-21, over which it is carried to the IP packet transmission equipment 100-3. That is, in the IP packet transmission equipment 100-2 no IP packet routing is performed but only optical path routing is carried out.

Figure 7B:
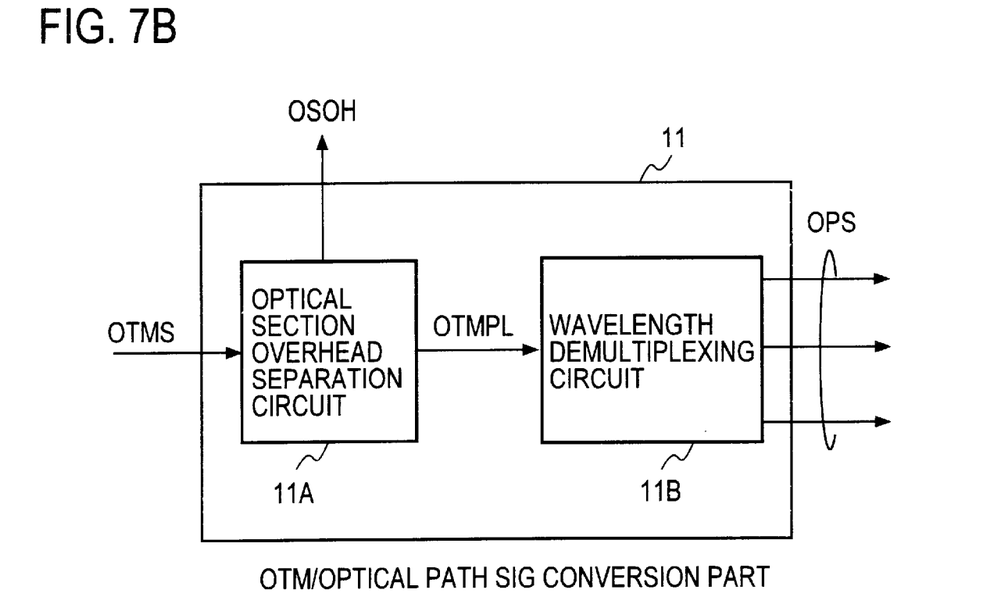
FIG. 7B is a block diagram of an OTM/optical path signal conversion part.

The input OTM signal is fed to the OTM/optical path signal conversion part 11-1. As depicted in FIG. 7B, the OTM/optical path signal conversion part 11-1 comprises an optical section separation circuit 11A and an optical path separation circuit 11B. The optical section overhead data OSOH of the input OTM signal is separated by the optical section overhead separation circuit 11A, and then only the OTM payload signal is applied to the optical path separation circuit 11B. In the optical path separation circuit 11B the input OTM payload signal is separated in wavelength (frequency), and optical paths of individual wavelengths are output. Now, consider only the optical path signal OPS which is input to the optical regenerator 13-1 as described previously. The optical path signal OPS input to the optical regenerator 13-1 is regenerative-repeated and then provided to the optical path switching part 14. The operation from the optical path switching part 14 to the formation of the OTM signal by the optical path signal/OTM conversion part 12-1 is the same as the operation in the afore-mentioned IP packet transmission equipment 100-1.

Finally, a description will be given of the operation of the IP packet transmission equipment 100-3 which is the receiving side in this example.

The OTM signal sent from the afore-mentioned IP packet transmission equipment 100-2 is input via the input optical backbone transmission line OBB-11 to the OTM/optical path signal conversion part 11-1, wherein the optical path signal OPS is extracted from the OTM signal, and it is applied to the optical regenerator 13-1. In the optical regenerator 13-1 the optical path signal OPS is regenerated, and it is provided by the optical path switching part 14 to the optical path signal/IP conversion part 18-1, wherein the IP packet is taken out, and from which it is provided to the IP packet routing part 16.

The operation from the OTM/optical path signal conversion part 11-1 to the optical path switching part 14 is the same as in the IP packet transmission equipment 100-2.

Figure 5B:
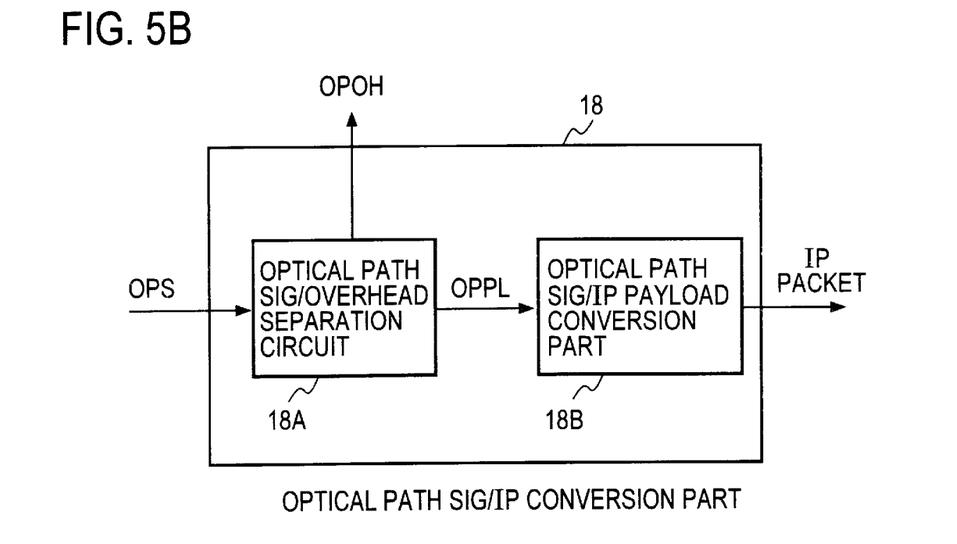
FIG. 5B is a block diagram of an optical path signal/IP conversion part.

In the optical path switching part 14 the optical path signal OPS is provided to the optical path signal/IP conversion part 18-1. The optical path signal/IP conversion part 18-1 is made up of an optical path signal overhead separation circuit circuit 18A and an optical path payload/conversion part 18B as depicted in FIG. 5B. The optical path signal OPS input to the optical path signal/IP conversion part 18-1 is fed to the optical path signal overhead separation circuit circuit 18A, wherein the optical path overhead area OPS3 is separated from the signal OPS. At the same time, it is converted from electrical to optical form, by which the data of the optical path overhead area OPS1 and OPS2 is separated, and only the optical path payload portion is input to the optical payload/IP conversion part 18B using the administrative unit pointer AU. Next, the optical path payload signal is subjected to speed changing, decoding and so on in the optical path payload/IP conversion part 18B, and the ultimate IP packet is provided to the IP packet routing part 16.

Thus, it is possible, with the IP packet transmission equipment, to realize high-capacity IP communication between IP packet transmission equipmentes over an optical path transport network.

Second Embodiment

Figure 9:
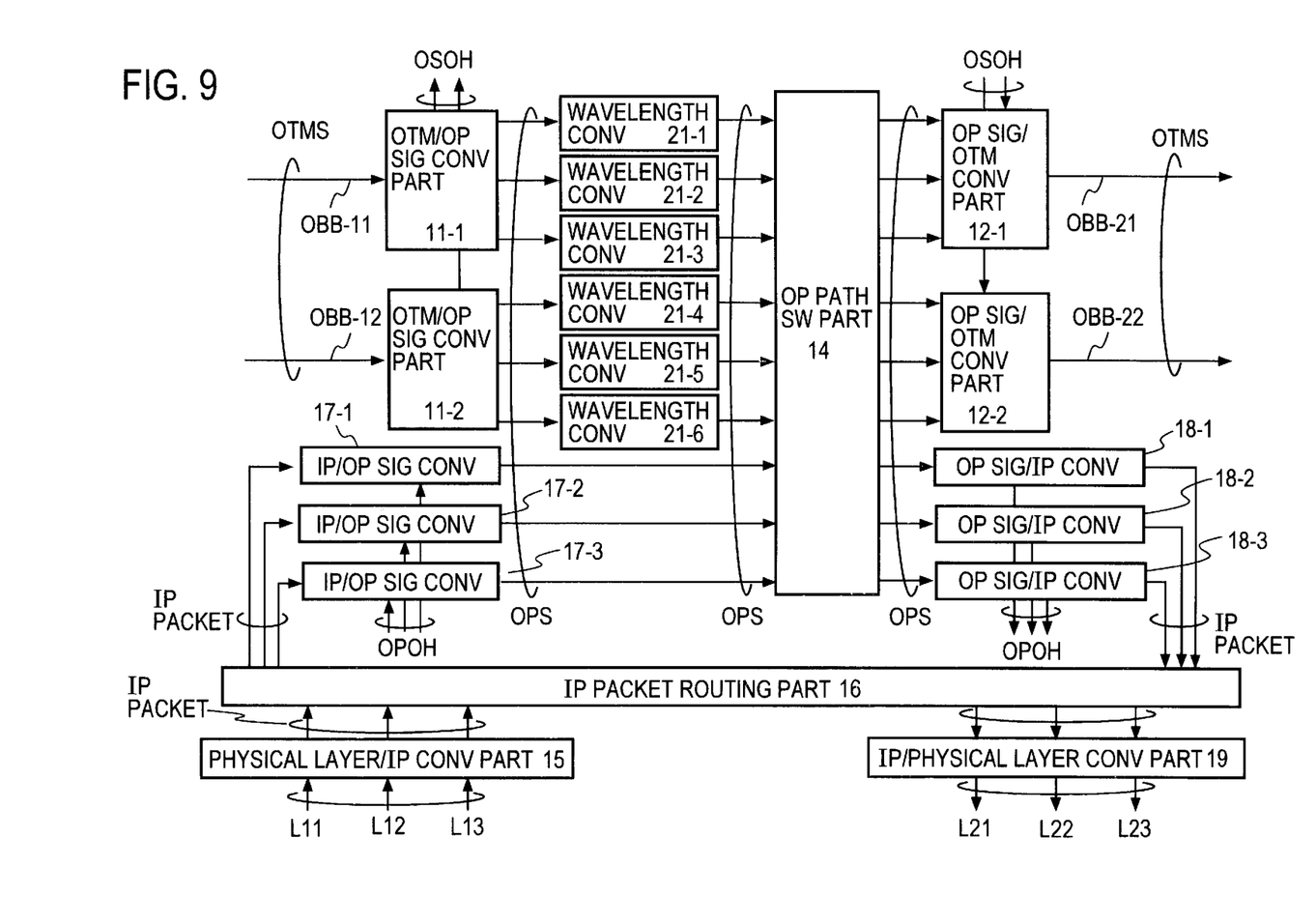
FIG. 9 is a block diagram illustrating a second embodiment of the present invention.

FIG. 9 illustrates a second embodiment of the IP packet transmission equipment according to the present invention.

This embodiment employs wavelength converters 21-1 to 21-6 in place of the optical regenerators 13-1 to 13-6 in the first embodiment shown in FIG. 4. This embodiment is identical in construction and operation with the first embodiment except the above.

The wavelength converters 21-1 to 21-6 output optical signals of predetermined different wavelengths. AT this time, the wavelengths are converted, but the signals themselves are not converted. The optical signals from the wavelength converters 21-1 to 21-6 are cross-connected by the optical path switching part 14 to the optical path signal/OTM conversion parts 12-1, 12-2 and the optical path signal/IP conversion parts 18-1, 18-2, 18-3 through predetermined routes. The wavelength converters 21-1 to 21-6 may be any types of variable-wavelength converters, as long as they are capable of switching output wavelengths $\lambda 1$ to $\lambda 6$.

The use of such wavelength converters permits selection of unused wavelengths at the time of selecting desired routes, and hence permits reduction of the required number of wavelengths as a whole.

While in the above the number of parts has been specified in the interest of simplicity, it is needless to say that the present invention is not limited specifically to such a number.

EFFECT OF THE INVENTION

As described above, according to the present invention, the IP packet transmission equipment is constructed by integrating the conventional optical cross-connect apparatus and the IP router so that the outputs of the Optical path signal conversion parts 17-1 to 17-3 of the IP router are connected directly to the optical path switching part 14. Accordingly, the OTM signal needed as an interface signal between the conventional optical path cross-connect apparatuses is unnecessary, and the OTM/optical path signal conversion parts and the optical path signal/OTM conversion parts of the prior art example can be dispensed with. Hence, the IP packet transmission equipment is highly economical in terms of the number of parts and monitoring/control.

It will be apparent that many modifications and variations may be effected without departing from the scope of the novel concepts of the present invention.

What is claimed is:

1. An IP packet transmission equipment which is provided in a node of a transmission network containing backbone transmission lines and branch transmission lines and transmits optical path signals between initial and terminal nodes via logically defined optical paths, said apparatus comprising:

wavelength demultiplexing means which receives from each of said backbone transmission lines a wavelength-multiplexed signal produced by wavelength-multiplexing optical path signals containing IP packets and demultiplexes said wavelength-multiplexed signal to optical path signals of individual wavelengths;

IP packet routing means for converting a transmission signal input from each of said branch transmission lines to IP packets and for outputting said IP packets to routes corresponding to their destinations;

IP/optical path converting means provided in an output route of said IP packet routing means, for converting said IP packets to optical signals;

optical path switching means which receives said optical path signals from said wavelength demultiplexing means and said optical path signals from said IP/optical path converting means and cross-connects said optical path signals to output routes corresponding to their destinations; and optical path multiplexing means which wavelength multiplexes said optical path signals on predetermined output routes from said optical path switching means to generates an output wavelength-multiplexed signal and outputs said wavelength-multiplexed signal to said each backbone transmission line.

2. The apparatus of claim 1, which further comprises optical path/IP converting means for converting the optical path signals on other output routes from said optical path switching means to IP packets and wherein said IP packet routing means includes means for converting said IP packets from said optical path/IP converting means to transmission signals and for outputting said transmission signals to branch transmission lines corresponding to their destinations.

3. The apparatus of claim 1, further comprising regenerating means provided between said optical path demultiplexing means and said optical path switching means, for regenerating said optical path signals from said optical signal separating means and for inputting said regenerated optical path signals to said optical path switching means.

4. The apparatus of claim 1, further comprising wavelength converting means provided between said optical path demultiplexing means and said optical path switching means, for converting the wavelengths of said optical path signals from said optical path separating means, for regenerating optical signals of said converted wavelengths and for inputting said regenerated optical path signals to said optical path switching means.

5. The apparatus of claim 1, 2, 3, or 4, wherein said optical path signals each contain an optical path payload area for storing an IP packet, and said IP/optical path signal converting means includes IP/optical path payload converting means for mapping said IP packet input thereto into said optical path payload area to generate a payload signal.

6. The apparatus of claim 5, wherein said optical path signals each have an overhead area containing at least one of connection control information, administrative information and monitoring information, and said IP/optical path signal converting means includes overhead inserting means for adding an overhead to said payload signal to generate a path signal and a laser light source for electro-optic conversion of said path signal to said optical path signal.

7. The apparatus of claim 1, 2, 3, or 4, wherein said optical path signal multiplexing means includes an optical path multiplexing circuit for wavelength-multiplexing input optical path signals to generate an optical section payload portion and optical section overhead inserting means for adding an optical section overhead to said optical section payload portion to generate a wavelength-multiplexed signal.

8. The apparatus of claim 1, 2, 3, or 4, wherein said optical path separating means includes an optical section overhead separating circuit for separating said wavelength-multiplexed signal input thereto to an optical section overhead portion and an optical section payload portion, and an optical path separating circuit for separating said optical section payload portion to optical path signals of individual wavelengths.

* * * * *